United States Patent
Jacobs et al.

[11] 3,825,734
[45] July 23, 1974

[54] MONITOR FOR MOVING VEHICLES

[75] Inventors: Norman H. Jacobs, Petersburg, Mich.; William C. Susor, Oregon, Ohio

[73] Assignee: Reliance Electric Company, Toledo, Ohio

[22] Filed: Mar. 14, 1973

[21] Appl. No.: 341,302

[52] U.S. Cl........... 235/151.33, 177/25, 235/151.32
[51] Int. Cl.......................... G06f 15/20, G06g 7/48
[58] Field of Search .... 235/151.33, 92 WT, 151.32, 235/92 NT, 92 TF; 177/DIG. 8, 25, 26, 163, 134; 246/122, 123, 124

[56] References Cited
UNITED STATES PATENTS

| | | | |
|---|---|---|---|
| 3,016,456 | 1/1962 | Corporon | 246/122 |
| 3,101,800 | 8/1963 | Raskin | 177/DIG. 8 |
| 3,133,189 | 5/1964 | Bagley et al. | 235/92 TF |
| 3,191,442 | 6/1965 | Hutchinson | 235/151.33 |
| 3,192,535 | 6/1965 | Watson | 235/151.33 |
| 3,393,757 | 7/1968 | Tonies | 177/25 |
| 3,446,299 | 5/1969 | Leonowicz | 177/25 |
| 3,492,570 | 1/1970 | Tanzman | 235/151.32 |
| 3,545,528 | 12/1970 | Chang | 235/151.32 |
| 3,662,845 | 5/1972 | Pratt | 177/25 |
| 3,674,097 | 7/1972 | Gile | 235/151.33 |

*Primary Examiner*—Malcolm A. Morrison
*Assistant Examiner*—Errol A. Krass
*Attorney, Agent, or Firm*—Thomas H. Grafton

[57] ABSTRACT

Apparatus for monitoring vehicles moving along a predetermined path, such as a train moving along a railroad track. At least two digital scales are positioned in the path and in a first embodiment include at least two load cells which are spaced apart less than the minimum axle spacing on the vehicles for successively measuring the axle weights of the moving vehicles. In a second embodiment, the load cells have a spacing greater than the maximum axle spacing on a truck at one end of a railroad car. The direction and speed of the vehicles are determined from the sequence and the time interval between peak outputs from the scales as the axles move sequentially over the scales. From the scale outputs, the apparatus may also determine when the vehicles stop or change direction, count the number of vehicles moving along the path, measure the total weight of each vehicle and identify the types of vehicles moving along the path. The output peaks from the scales are compared for detecting a failure in either scale during operation of the apparatus which would cause the peak weights to deviate by more than a permissable tolerance.

14 Claims, 4 Drawing Figures

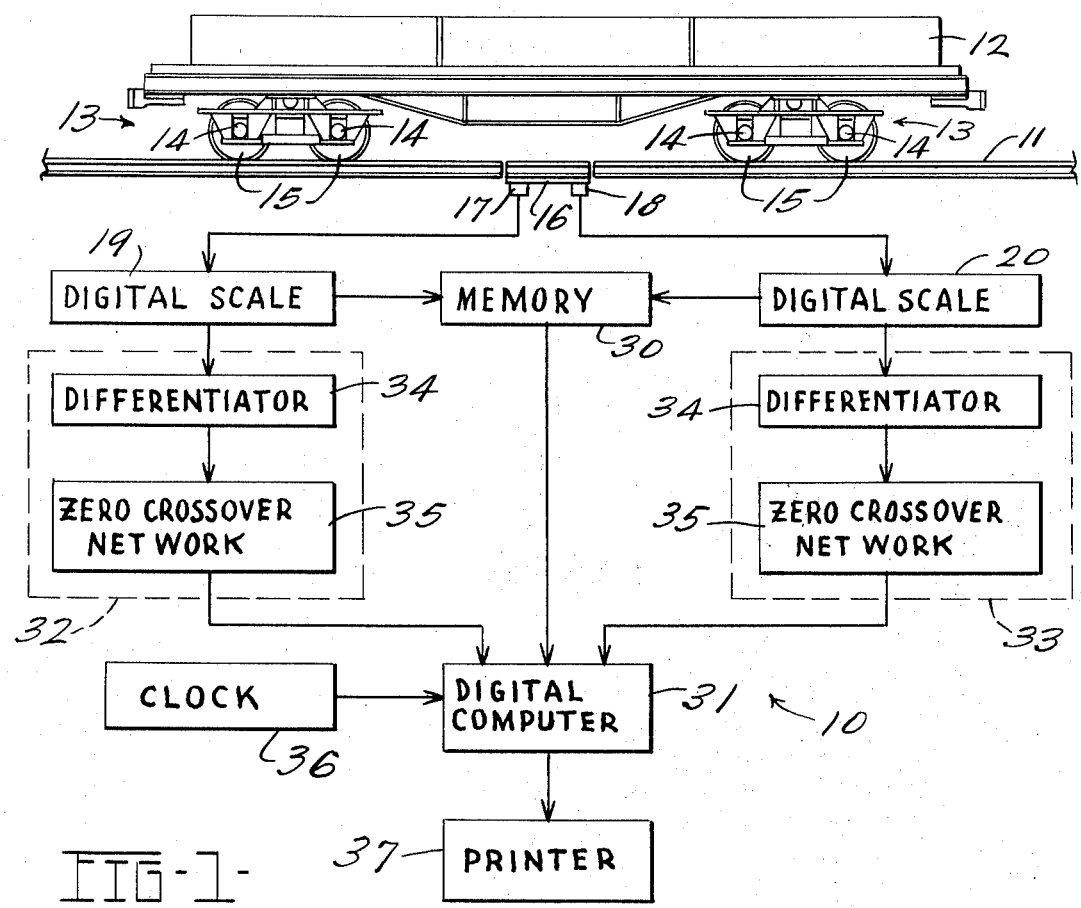
FIG-1-
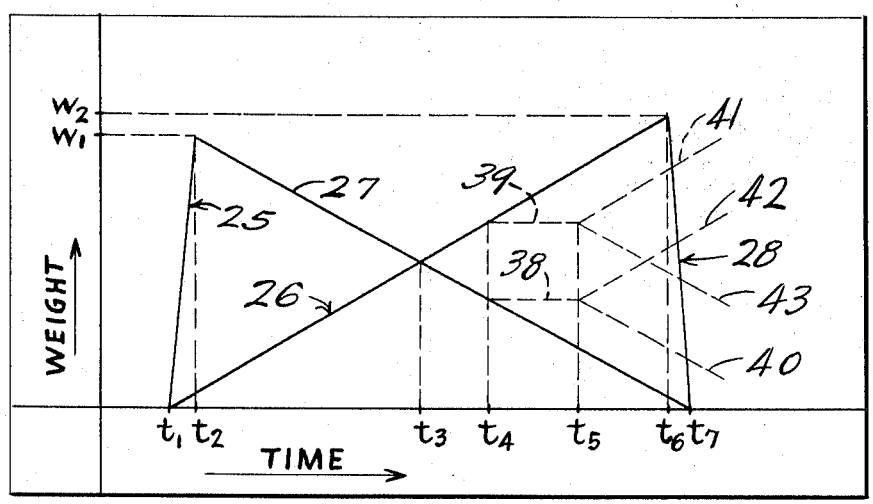
FIG-2-

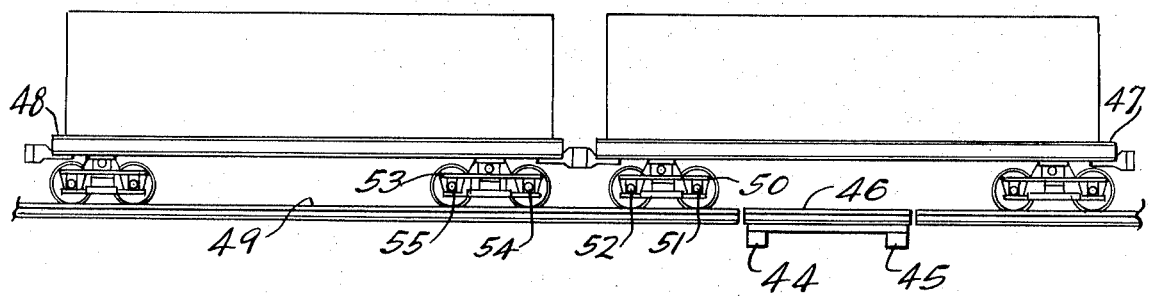
FIG-3-
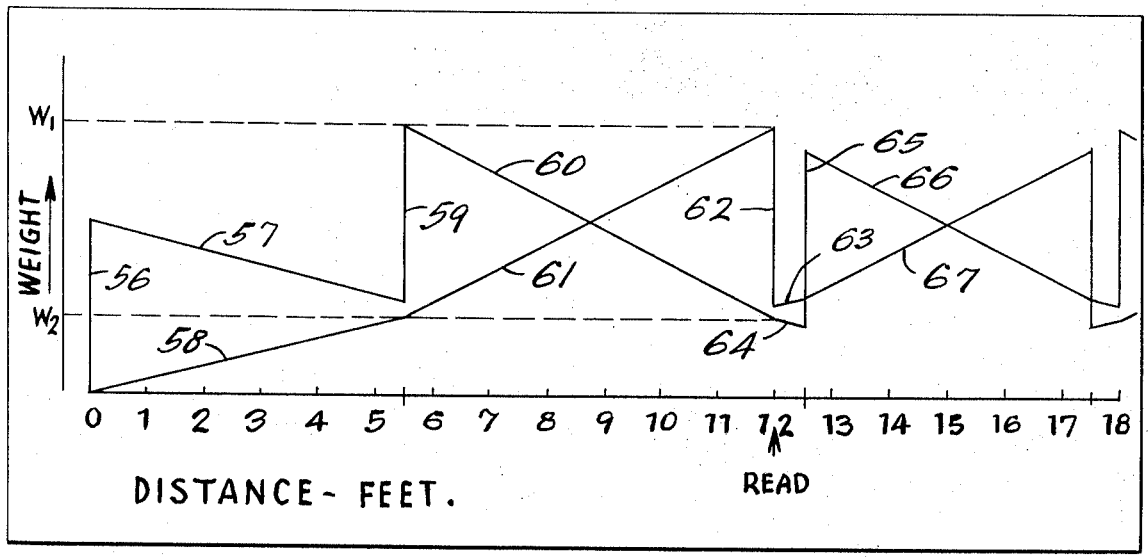
FIG-4-

MONITOR FOR MOVING VEHICLES

BACKGROUND OF THE INVENTION

This invention relates to weighing apparatus and more particularly to apparatus for monitoring trains moving along a railroad track.

In the transportation industry, and particularly in the railroad industry, it is often desirable to obtain information on vehicles moving along a predetermined path or track. In the past, for example, various types of apparatus have been used for monitoring the movement of railroad trains to determine the direction and number of cars moving along a railroad, the weight of the cars and to identify each car. The direction, number and speed of cars moving along a railroad track have sometimes been detected by means of a pair of switches positioned under the track. The switches are typically spaced apart less than a minimum axle spacing on the railroad cars. As the cars move along the track, the wheels on each axle sequentially close the two switches. The direction in which the train is moving can be determined from the sequence in which the switches are closed and the number of times in which each switch is closed is functionally relates to the number of cars in the train. The switches may also be used for measuring the speed of the train. The speed of the train will equal the distance between the switches divided by the time interval for a wheel to pass between the switches. The weight of each car in a train moving along a track has also sometimes been measured by placing a single scale under the tracks. However, due to various factors such as changes in weather, prior art scales of this type have not always been reliable. To date, there has been no satisfactory means for determining while such scales are in operation when they fail to operate properly. Many other types of devices have also been used for monitoring trains. In recent years, most railroad cars are provided with a strip comprising a large number of color coded bars. An optical scanner detects the bars of each car in a moving train and may through the use of a computer accurately identify each car while it is moving.

SUMMARY OF THE INVENTION

According to the present invention, improved apparatus is provided for monitoring railroad cars and similar vehicles moving along a track. The device can determine the direction and speed of the train, the weight of each car in the train, the number of cars in the train, and the general type of cars from which the train is composed. The device also continuously detects for a faulty condition which could cause an erroneous indication of one or more of the monitored conditions. The device includes a scale platform position under a portion of the railroad tracks and, in a first embodiment, having a width less than the minimum possible spacing between axles on the railroad cars. In a second embodiment, the scale platform has a width appreciably greater than the maximum axle spacing at one end of a car. At least two load cells are positioned under opposite edges of the scale platform and the load cells are connected to separate digital scales. As the wheels on each axle on a car move over the scale platform, the output of the scale connected to the load cell under the leading edge of the platform will rapidly rise to a peak value and, subsequently, will gradually decrease. The output of the scale connected to the load cell at the trailing edge of the platform will gradually increase to a peak value and subsequently rapidly decrease. The peak outputs of each of the digital scales are compared. In the event of a failure of either scale or load cell, the peak readings will deviate by more than a permissible tolerance.

Means are provided for detecting the peaks in the scale outputs and for measuring the time interval between such peaks. Such time interval will be inversely proportional to the speed of the moving railroad car passing over the scale platform. It will also be apparent that the sequence in which the peaks appear will be an indication of the direction of the car and if the scale outputs level off, it will be an indication that the car has stopped. A digital computer calculates the speed of the car from the measured time interval and may cause a printer to print both the speed and direction. The computer may also sum the axle weights for each car to obtain a total car weight and print such weight. As the cars sequentially move over the scale platform, the computer is also programmed to count the number of cars in the train. Finally, the time interval between successive axles passing over the scale platform may be measured and the computer may calculate the axle spacing from the previously measured speed of the car. Such axle spacings may be compared with known spacings for different types of cars such as tank cars, flat cars, box cars, and the like. Through such a comparison, an indication may be made of the types of cars forming the train.

Accordingly, it is a preferred object of the invention to provide improved apparatus for monitoring vehicles moving along a predetermined path.

Another object of the invention is to provide improved apparatus for monitoring a train moving along a railroad track.

Still another object of the invention is to provide improved apparatus for measuring the direction and speed of a moving train, the weight of each car forming the train, a count of the number of cars in the train and an indication of the types of cars forming the train as the train moves along a track.

Still another object of the invention is to provide scale apparatus for weighing a train moving along a railroad track which includes means for detecting a failure of such apparatus while the apparatus is in operation.

Other objects and advantages of the invention will become apparent from the following detailed description, with reference being made to the accompanying drawings.

BRIEF DESCRIPTION OF THE DRAWINGS

FIG. 1 is a pictorial block diagram of apparatus constructed in accordance with the present invention for monitoring a train moving along a railroad track;

FIG. 2 is a graph showing the outputs of the two load cells for the apparatus of FIG. 1 as the axle of a railroad car moves across the scale platform;

FIG. 3 is a pictorial diagram showing a modification to a portion of the apparatus of FIG. 1; and FIG. 4 is a graph showing outputs of the two load cells in the modified apparatus of FIG. 3.

DESCRIPTION OF THE PREFERRED EMBODIMENTS

Turning to FIG. 1, a pictorial block diagram is shown of improved apparatus 10 for monitoring vehicles moving along a predetermined path. The apparatus 10 is shown in use with trains moving along railroad tracks 11. However, it will be appreciated that the apparatus may be used with vehicles other than trains and moving along a predetermined path other than a railroad track. A single railroad car 12 is shown on the tracks 11. A truck 13 is located at each end of the car 12 and includes two spaced axles 14 for mounting four wheels 15.

A scale platform 16 is located below a section of the tracks 11. The width of the platform 16 is less than the minimum spacing between two adjacent axles 14 on the truck 13. The scale platform 16 is positioned such that as an axle and the attached wheels pass over the platform 16, the entire weight on the axles 14 is exerted on the platform 16. A load cell 17 is positioned under one edge of the platform 16 and a load cell 18 is positioned under the opposite edge of the platform 16. Thus, the load cells 17 and 18 are spaced under the tracks 11 in the direction in which the car 12 moves. The load cell 17 is connected to the input of a digital scale 19 and the load cell 18 is connected to the input of a digital scale 20. The digital scales 19 and 20 may be of any conventional design, or they may be of the type disclosed in U.S. Pat. application Ser. No. 185,045 now U.S. Pat. No. 3,709,309 entitled Electronic Weighing System with Digital Readout and assigned to the assignee of the present application. The digital scales 19 and 20 each have a digital output corresponding to the weights appearing on the load cells 17 and 18, respectively, and may also have an analog output which is proportional to the weight on the load cells 17 and 18, respectively.

Turning for a moment to FIG. 2, a graph is shown for typical weights appearing adjacent opposite edges of the scale platform 16 as a single axis 14 on the car 12 moves over the scale platform 16. These weights are shown in an analog format similar to the signals supplied by the load cells 17 and 18 to the scales 19 and 20, respectively, or to signals appearing at auxiliary analog outputs from the scales 19 and 20. However, FIG. 2 does not show noise which can occur when the car 12 first strikes or moves onto the scale platform 16. The wheels 15 on one axle 14 roll over a leading edge of the platform 16 at time $t_1$. At such time, the adjacent or leading one of the load cells 17 or 18 will have an output 25 which increases at a relatively fast rate and the remote one of the load cells 18 or 17 will have an output 26 which increases at a much slower rate. The rapidly increasing output 25 of the leading load cell 17 or 18 will continue to a peak value indicated by the weight $W_1$ when the axle 14 is directly over such load cell 17 or 18 at time $t_2$. The output of the load cell will then decrease at a more gradual rate as shown at 27 until the time $t_7$ when the wheels 15 leave the scale platform 16. At the same time, the output 26 of the other or remote load cell 18 or 17 gradually builds up to a peak value indicated by the weight $W_2$ at the time $t_6$. After time $t_6$, this load cell has a rapidly decreasing output 28 to the time $t_7$ when the wheels 15 leave the scale platform 16. Coincidence between the decreasing output 27 of the adjacent load cell 17 or 18 and the increasing output 26 of the remote load cell 18 or 17 will occur at the time $t_3$.

It should be appreciated that at least theoretically the peak weights $W_1$ and $W_2$ will be equal. However, normal variations in the ratings of the load cells 17 and 18 and the components of the scales 19 and 20 may cause the weights $W_1$ and $W_2$ to vary by a permissible tolerance. A variation may also occur in the peak outputs $W_1$ and $W_2$ of the digital scales 19 and 20 in the event of an electrical failure in either of the load cells 17 and 18, in a failure of the component parts of either scale 19 or 20 or a failure in the mechanical structure of the scale platform 16 and the load cells 17 and 18.

The digital weight outputs from the scales 19 and 20 are applied to a memory 30 which may, for example, be a digital storage register. The contents of the memory 30 are applied to a digital computer 31 which is of a conventional design. Signals are also applied to the computer 31 for indicating when the outputs of the scales 19 and 20 are at peak values. The scale 19 has an output connected through a peak value detector 32 to the computer 31 and the scale 20 has an output connected through a peak value detector 33 to the computer 31. If the scale output is of an analog type as shown in FIG. 2, the peak value detectors 32 and 33 may consist of a differentiator circuit 34 and a zero crossover network 35. Such circuits are well known in the prior art. The differentiator circuits 34 will have outputs corresponding to the slope of the changing weight signal from the load cells 17 and 18. It will be appreciated from the graph of FIG. 2 that the slopes will change from a positive value to a negative value at the peak weights $W_1$ and $W_2$. Such a change is detected by the zero crossover network 35 and applied as a signal to the computer 31. In a modified embodiment of the invention, the digital weight output of the scales 19 and 20 may be applied to the peak value detectors 32 and 33, respectively. The detectors 32 and 33 may include apparatus for comparing successive weight values. When successive digital weights cease increasing and begin decreasing, the detectors 32 and 33 apply a signal to the digital computer 31. Such circuits will be readily apparent to those skilled in the art. The computer 31 also has an input from a clock 36 and an output to a printer 37.

In describing the operation of the apparatus 10, we will assume for the moment that the car 12 in FIG. 1 is moving from left to right. As the next pair of wheels 15 on an axle 14 moves onto the scale platform 16, the load cell 17 at the leading edge of the platform 16 will have an output similar to the output 25 in FIG. 2 which begins at time $t_1$ and increases to a peak value at the time $t_2$. The load cell 18 will have an output corresponding to the output 26 in FIG. 2 which increases from the time $t_1$ when the wheels 15 first move onto the platform 16 to a peak value at time $t_6$ when the axle 14 and the wheels 15 are directly over the load cell 18. The digital scales 19 and 20 periodically convert the analog outputs from the load cells 17 and 18, respectively, to weight signals which are stored in the memory 30. For accuracy in weight measurement, weight readings will be made at vehicle speeds of less than 5 miles per hour. At such speeds, the scales 19 and 20 may be cycled 5 times per second. At time $t_2$ when the axle 14 is directly over the load cell 17, the scale 19 will have a peak output. This peak is sensed by the detector 32 and a signal is applied to the computer 31. This causes the computer 31 to store the peak weight value and to start a time measurement by, for example, counting pulses from the clock 36. The time measurement continues until the output of the scale 20 reaches a peak value, at which time the detector 33 applies a signal to the computer 31. At this instance, the computer 31 will have completed a measurement of the time interval required for the axle to move the distance between the two spaced load cells 17 and 18. From this measured time interval and the known distance between the load cells 17 and 18, the computer 31 will calculate the speed of the car 12 and will cause the printer 37 to print this speed.

Since the peak detector 32 applied a signal to the computer 31 prior to the peak detector 33, the computer 31 may be programmed to supply information to the printer 37 indicating that the car 12 is moving in a direction from left to right. The computer 31 may be provided with a memory which counts the number of axles passing over the scale platform 16 and may be programmed to divide such number by four to give a count of the number of cars 12 passing over the platform 16. The memory for the computer 31 may also store the weight of each axle as measured by either of the scales 19 or 20, or as an average of the weight readings from the scales 19 and 20. Such weights may be cumulated for each of the four axles 14 on each car 12 and supplied to the printer as a measure of the total weight of each car 12. For the highest degree of accuracy, the weight reading for each car 12 should be taken just prior to the time $t_6$. When an axle 14 first moves over the platform 16, noise will occur on the load cell outputs 25–27. If the weight reading is delayed until just prior to $t_6$, substantially all of the noise can be filtered from the outputs 26 and 27.

Another measurement which may be made by the computer 31 is the time interval between the passage over the platform 16 of each of the axles 14 on a car 12. Such time intervals may be measured at any convenient point, such as between the times $t_1$ when each successive axle first enters the region of the platform 16, between either the times $t_2$ or $t_6$ for successive axles when one of the scales 19 or 20 reaches successive peak readings, between the times $t_3$ for successive axles when the axles are centered over the platform 16 and the outputs of the scales 19 and 20 coincide or the times $t_5$ when the successive axles 14 leave the region of the platform 16. From the calculated speed and the measured time intervals between successive axles, the axle spacings for each car 12 may be accurately measured. The computer 31 may be adapted to store information relating to the axle spacings of different types of railroad cars such as flat cars, tank cars, box cars, and the like. The measured axle spacings for each car are compared with the stored information to identify the type of each car 12 passing over the scale platform 16. The printer 37 may then be instructed to print information identifying the car type.

The computer 31 also continuously monitors for a failure in either of the load cells 17 and 18 or the connected scales 19 and 20. As previously indicated, the peak weights $W_1$ and $W_2$ appearing at the outputs of the scales 19 and 20 are applied through the memory 30 to the computer 31. Such peak weights for each axle 14 are compared by the computer 31. If the weights deviate by more than the permissible tolerance, this would be an indication of a failure of some portion of the weighing apparatus, such as one of the load cells 17 or 18 or one of the scales 19 or 20. In such case, the computer 31 may activate a warning light or buzzer or other alarm or cause the printer 37 to print a warning relating to such deviation in the measured weights. Thus, it will be appreciated that the operation of the scales 19 and 20, the load cells 17 and 18 and the platform 16 may be continuously monitored during operation of the apparatus 10.

Unlike prior art devices, the apparatus 10 may also detect when the car 12 stops and it can determine in which direction the car 12 is moving when it again starts. Turning again to FIG. 2, if we assume that the car 12 has stopped at the time $t_4$ with an axle 14 on a truck 13 positioned over the scale platform 16, the effect on the weights is shown in dashed lines. When this occurs, the leading one of the load cells 17 or 18 will have a constant output 38 and the remote one of the load cells 18 or 17 will have a constant output 39. These outputs 38 and 39 will remain constant until the car 12 again starts moving at a time $t_5$. If the car 12 continues in a forward direction, the leading load cell 17 or 18 will again have a decreasing output 40 and the remote one of the load cells 18 or 17 will again have an increasing output 41. The slopes of the outputs 40 and 41, of course, will depend upon the speed of the car 12. Should the car 12 reverse its direction, the leading one of the load cells 17 or 18 will now have an output 42 which increases to a peak value and the remote one of the load cells 18 or 17 will have a decreasing output 43. The outputs 38–43 may be detected by the detectors 32 and 33 and the printer 37 may be instructed to print information relating to stoppages and changes in direction of the car 12.

Referring now to FIGS. 3 and 4, a modified embodiment of the invention is shown. Apparatus similar to that shown in FIG. 1 is connected to a pair of load cells 44 and 45 located under ends of a scale platform 46. The scale platform 46 is of a length appreciably longer than the maximum axle spacing on a railroad car truck. Typically, the spacing between two axles on a truck is on the order of 5 feet 6 inches to 5 feet 11 inches and the spacing between adjacent axles on two coupled cars is 7 feet or greater. With these measurements, the platform 46 may have a length on the order of 12 feet such that the two axles on a truck will be over the platform 46 for a relatively long time interval. Two flat cars 47 and 48 are shown on a track section 49 in FIG. 3. A truck 50 is located at the end of the car 47 adjacent the car 48. The truck 50 mounts a pair of spaced axles 51 and 52. Similarly, a truck 53 is located at the end of the car 48 coupled to the car 47 and mounts a pair of spaced axles 54 and 55. From the following description, it will be assumed that the cars 47 and 48 are moving slowly from left to right such that the truck 50 is about to move over the scale platform 46.

In FIG. 4, a graph is shown comparing the weights measured by the load cells 44 and 45 against the distances moved by the cars 47 and 48. When the axle 51 first moves onto the edge of the platform 46, the distance on the graph will be assumed to be zero. The weight readings on the graph of FIG. 4 are shown as the cars 47 and 48 move to the right from this position.

At the zero mark, when the axle 51 first moves onto the platform 46 and over the load cell 44, the load cell 44 will have a rapidly increasing output 56 which reaches a value proportional to the weight on the axle 51. As the car 47 continues to move, the weight measured by the load cell 44 will gradually decrease as shown by the output 57. At the same time, a gradually increasing load will appear on the load cell 45, as shown by the output 58. After the car 47 has moved 5½ feet, the output of the load cell 44 will take another jump, as shown at 59, when the second axle 52 moves onto the platform 46. At this instance, the load cell 45 will indicate a relatively low weight $W_1$ and the load cell 44 will indicate a substantially larger weight $W_2$. The sum of $W_1$ and $W_2$ equals the total weight on the platform 46 from the truck 50. As the truck 50 continues to move across the platform 46, the load cell 44 will have a decreasing output 60 and the load cell 45 will have an increasing output 61. While the truck 50 is on the platform 46 between the distances 5½ feet and 12 feet, the sum of the outputs 60 and 61 will at any distance equal the total weight of the truck 50.

At an instance just prior to the 12 foot mark, the load cell 45 will now have an output $W_2$ and the load cell 44 will have an output $W_1$. The peak weight $W_2$ on the load cell 45 at the 12 foot mark will be compared with the peak weight $W_2$ on the load cell 44 at the 5½ foot mark by the computer 31. If these weights are not substantially equal, the computer 31 will indicate that a fault condition has occurred in the apparatus 10.

As the car 47 moves past the 12 foot mark, the axle 51 moves off of the platform 46 and the output of the load cell 45 takes a sudden decrease, as shown at 62. The load cell 45 will then have a gradually increasing output 63 as the axle 52 moves toward the load cell 45 and the load cell 44 will have a gradually decreasing output 64 as the axle 52 moves away from the load cell 44. At the 12½ foot mark, the axle 54 on the next car 48 moves onto the platform 46, causing a sudden increase 65 in the output of the load cell 44. However, due to the increased spacing between the axles 52 and 54, the magnitude of the output of the load cell 44 is less than $W_2$. This will be detected by the computer 31 and no weight reading will be entered. As the cars 47 and 48 continue to move, the load cell 44 will have a decreasing output 66 and the load cell 45 will have an increasing output 67. However, again, the output of the load cell 45 will not reach the magnitude $W_2$ before the axle 52 leaves the scale platform 46 at 17½ feet. Thus, in the modified embodiment of the apparatus 10, only the highest peak weight readings will be used for measuring the truck weights at the ends of a railway car.

The computer 31 is preferably adapted to be responsive to the change between the outputs 61 and 62 of the load cell 45. When the sudden change in slope is detected by the detector 33 at the 12 foot mark, the computer 31 will read the last weight readings from the scales 19 and 20, which will be from just prior to the 12 foot mark. The reading is preferably taken at this position of the truck 50 since sufficient time will have elapsed for any noise caused by the axles 51 and 52 moving onto the scale platform 46 to have subsided or been filtered from the weight readings. Again, it will be noted that if the cars 47 or 48 should stop at any point, the weights measured by the load cells 44 and 45 will become constant. Normally, the output of one of the load cells 44 or 45 will be used for measuring the axle spacing. For a fixed vehicle speed, the spacing between the axles 51 and 52 can be determined from the outputs 56 and 59 and the spacing between the axles 52 and 54 can be determined from the outputs 59 and 65 from the load cell 44. Similarly, the speed of the car 47 can be determined from the output 56 of the load cell 44 when the axle 51 first moves onto the platform 46 and the output 62 of the load cell 45 when the axle 51 leaves the platform.

It will be appreciated that various modifications and changes may be made in the above-described monitor for vehicles moving along a predetermined path. The apparatus 10 may, for example, be used only for measuring selected conditions of a moving train, such as only the speed of the train or only the total weights of the cars. Furthermore, it will be appreciated that the digital computer 31 may be a special purpose analog or digital computer or it may be an existing digital computer used on a time sharing basis. The memory 30 may also be an internal memory in the computer. Various other modifications and changes may also be made without departing from the spirit and the scope of the claimed invention.

What we claim is:

1. Apparatus for monitoring vehicles moving along a predetermined path, such vehicles having a plurality of wheels on axles mounted adjacent each vehicle end with such axles having predetermined spacings, comprising, in combination, a scale platform located along a portion of the path, at least two load cells, said load cells positioned under said platform and spaced apart in the direction of the path, at least two scales each having an input connected to a different one of said load cells and each having an output proportional to the axle weights placed on the connected load cell as the vehicles move along the path, and means for comparing such scale outputs to monitor vehicles moving along the path.

2. Apparatus for monitoring vehicles moving along a predetermined path, as set forth in claim 1, wherein said scales are digital scales having digital outputs corresponding to the weight on said scale platform.

3. Apparatus for monitoring vehicles moving along a predetermined path, as set forth in claim 2, wherein said scale platform has a maximum length in the direction of the path less than the minimum spacing between axles at an end of any of the vehicles whereby only a single axle can be located over said scale platform.

4. Apparatus for monitoring vehicles moving along a predetermined path, as set forth in claim 3, wherein said comparing means includes means for sensing the peak output from each of said scales as the vehicle axles move over said platform, means for measuring the time interval between such output peaks, and means for calculating the speed of such vehicle from such time interval and the spacing between said load cells.

5. Apparatus for monitoring vehicles moving along a predetermined path, as set forth in claim 4, and wherein said comparing means further includes means for measuring the axle spacing on each vehicle passing over said scale platform from the output of at least one of said load cells and the calculated vehicle speed, and means for comparing such measured axle spacings with known axle spacings for different types of vehicles to identify the type of each vehicle passing over said scale platform.

6. Apparatus for monitoring vehicles moving along a predetermined path, as set forth in claim 2, and wherein said comparing means includes means for measuring the peak output of each of said scales as a vehicle axle moves over said scale platform, and wherein said comparing means compares such peak scale outputs.

7. Apparatus for monitoring vehicles moving along a predetermined path, as set forth in claim 6, and including alarm means, and wherein said comparing means includes means for energizing said alarm means in response to a predetermined deviation between such peak scale outputs.

8. Apparatus for monitoring vehicles moving along a predetermined path, as set forth in claim 6, wherein said scale platform has a length in the direction of the path greater than the maximum spacing of axles at any end of all vehicles whereby all axles at an end of a vehicle can be located on said scale platform and wherein said measuring means measures the peak output of said scales as such axles at a vehicle end move over said scale platform.

9. Apparatus for monitoring vehicles moving along a predetermined path, as set forth in claim 8, wherein said comparing means further includes means responsive to the outputs of said load cells for measuring the total weight of each vehicle moving over said scale platform.

10. Apparatus for monitoring vehicles moving along a predetermined path, as set forth in claim 6, wherein said comparing means further includes means responsive to the peak output of at least one of said scales for measuring the total weight of each vehicle over said scale platform.

11. Apparatus for monitoring vehicles moving along a predetermined path, as set forth in claim 10, wherein said comparing means further includes means responsive to the output of at least one of said load cells for counting the number of vehicles moving over said scale platform.

12. Apparatus for monitoring vehicles moving along a predetermined path, as set forth in claim 2, wherein said comparing means further includes means for storing the peak output of at least one of said scales as the wheels on each successive vehicle axle move over said scale platform, and means for summing such stored peak outputs for all axles of a vehicle as a measure of the total weight of such vehicle.

13. Apparatus for monitoring vehicles moving along a predetermined path, as set forth in claim 1, and including means responsive to such scale outputs for detecting a change in the direction of a vehicle moving over said scale platform.

14. Apparatus for monitoring vehicles moving along a predetermined path, as set forth in claim 13, wherein said detecting means further detects a stoppage a vehicle moving over said scale platform.

* * * * *